May 12, 1953

A. A. MAYER 2,638,203

ARTICLE COUNTING AND CONVEYING APPARATUS

Filed July 28, 1951

INVENTOR
ALBERT A. MAYER

BY Carr & Carr & Gravely
ATTORNEYS

May 12, 1953  A. A. MAYER  2,638,203
ARTICLE COUNTING AND CONVEYING APPARATUS
Filed July 28, 1951  5 Sheets-Sheet 2
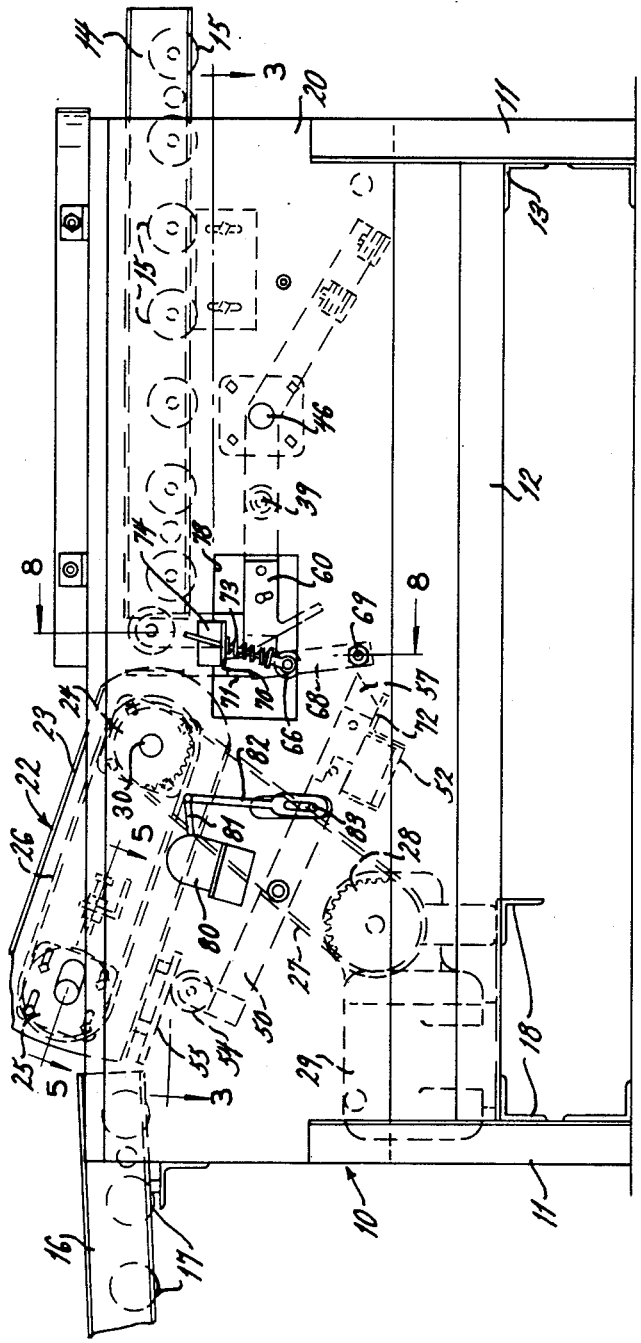
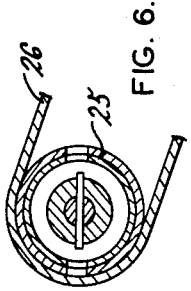
FIG. 2.
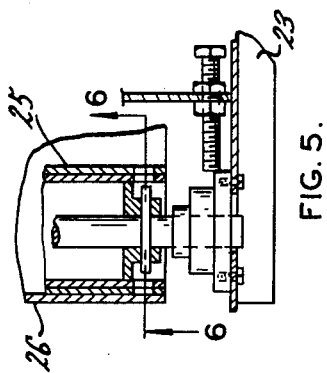
FIG. 5.
FIG. 6.
INVENTOR
ALBERT A. MAYER
BY Carr & Carr & Gravely
ATTORNEYS

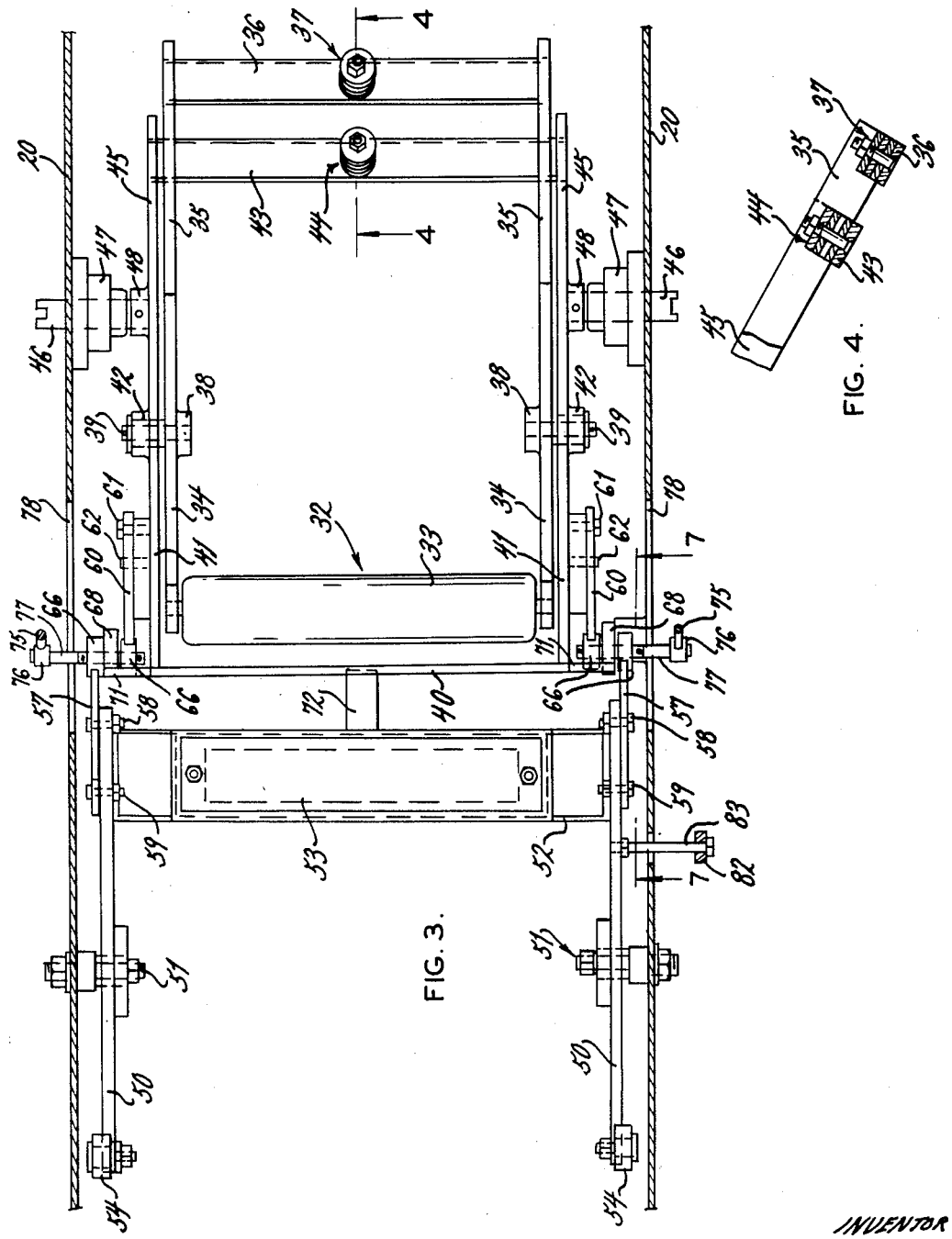

INVENTOR
ALBERT A. MAYER
BY Carr & Carr & Gravely
ATTORNEYS

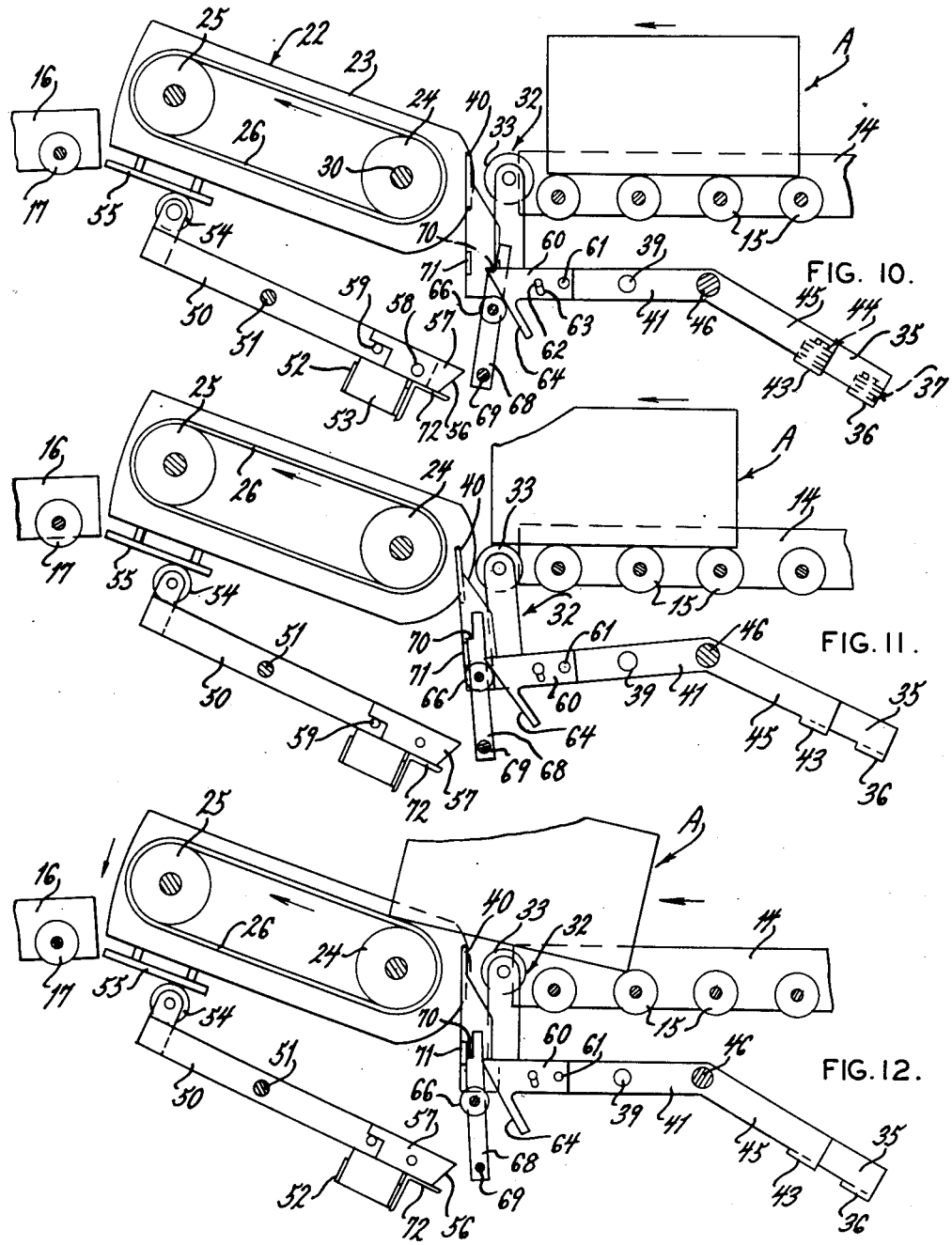

Patented May 12, 1953

2,638,203

UNITED STATES PATENT OFFICE 2,638,203

ARTICLE COUNTING AND CONVEYING APPARATUS

Albert A. Mayer, Little Falls, N. J.

Application July 28, 1951, Serial No. 239,107

6 Claims. (Cl. 198—34)

This invention relates to apparatus for conveying and counting articles such as cases, cartons, packages and the like, and more particularly to improvements therein.

The principal object of this invention is to provide a simple oscillating or swinging conveyor for conveying articles in a regulated order or sequence and for counting the individual articles conveyed through the apparatus.

It is also an object of this invention to provide conveyor apparatus for determining the movement of articles by means of the responsive action of a portion of the mechanism to the weight or other physical characteristic of the articles conveyed.

It is a further object of this invention to provide apparatus of the above character having a conveying section positively responsive to the weight of the conveyed articles and to provide cooperating automatic mechanism for counting and for determining the spaced movement of articles through the apparatus.

The invention consists in apparatus for conveying articles between a loading or receiving station and a delivery or discharge station, and an article sequence or spacing and counting means responsive to the weight or physical characteristic of the articles coming from the loading station, whereby the articles may be spaced or segregated and simultaneously counted to facilitate the further handling thereof.

The invention furthermore consists in the parts and in the combination, association and assembly of parts hereinafter to be described in detail, reference being had to the accompanying drawings, wherein:

Fig. 2 is a side elevational view of the apparatus of Fig. 1;

Fig. 3 is a sectional plan view of the apparatus as seen along the line 3—3 in Fig. 2;

Fig. 4 is a detailed and fragmentary sectional elevation of counterweighted levers, seen at line 4—4 in Fig. 3;

Fig. 5 is an enlarged fragmentary sectional view of an adjustable conveyor belt roller seen along the line 5—5 in Fig. 2;

Fig. 6 is a fragmentary sectional view of the conveyor belt roller means shown in Fig. 5, this view being taken along the line 6—6 thereof;

Fig. 9 is an enlarged fragmentary view of the latch arm and trip lever in an operative position differing from that of Fig. 7;

Fig. 10 is a diagrammatic view of the present conveyor and counting apparatus, shown in its normally inclined or inoperative position;

Fig. 11 is a diagrammatic view showing a first stage in the operation of the apparatus;

Fig. 12 is a diagrammatic view showing a further stage in the operation of the apparatus;

Figure 1:
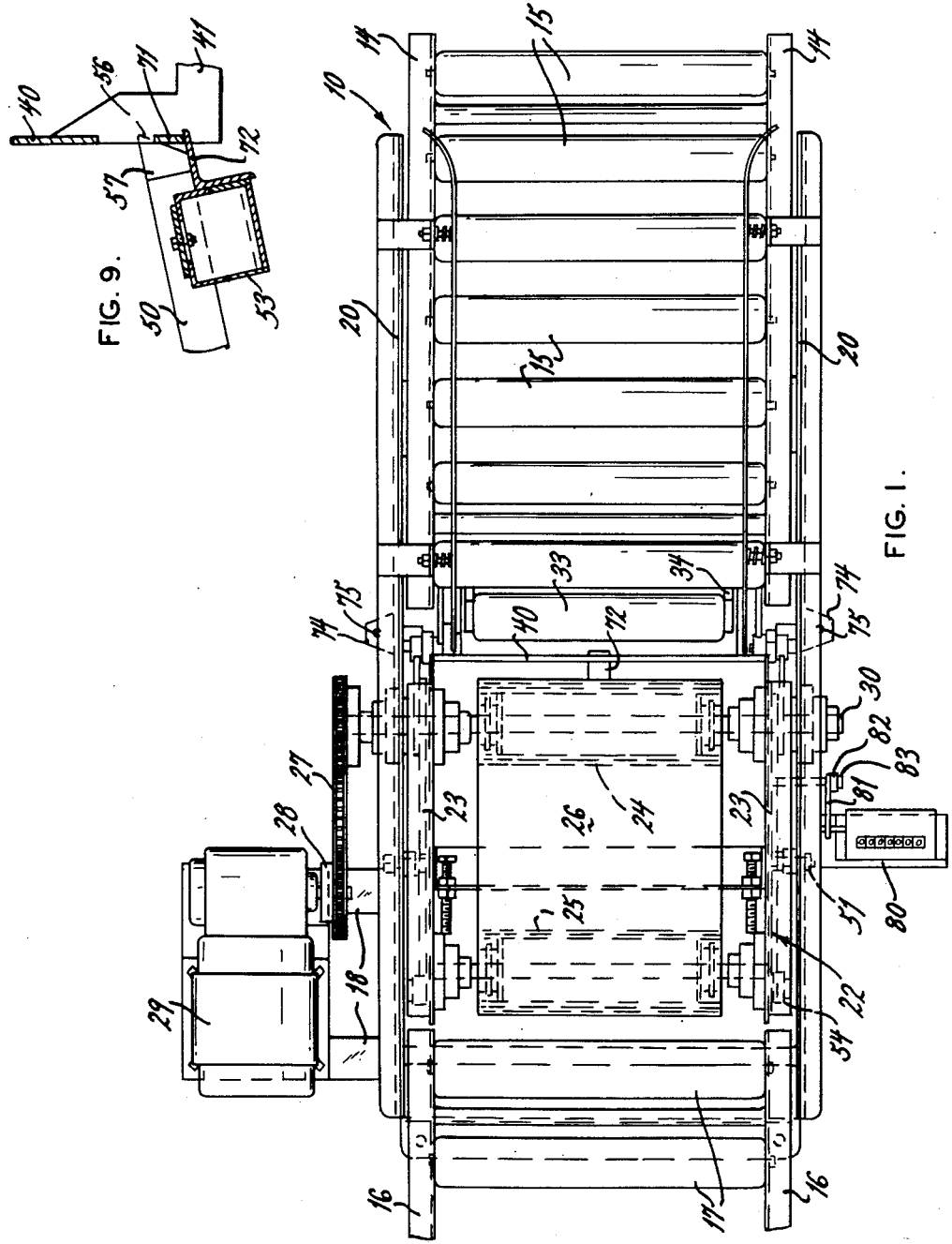
Fig. 1 is a top plan view of the article counting and conveying apparatus embodying the principles of the present invention.

The present conveying and counting apparatus will first be described in connection with Figs. 1, 2 and 3. In these views, the apparatus includes the usual frame assembly 10 having the supporting legs 11 joined together by suitably disposed brace members 12 and 13 to provide support for a first pair of members 14 for conveyor rollers 15 and a longitudinally spaced pair of members 16 for other conveyor rollers 17. The frame 10 also includes suitable longitudinally disposed side panels 20 enclosing the operating mechanism of the conveyor. It will be understood that the conveyor rollers 15 are utilized to receive packages or articles to be conveyed and counted by the present mechanism and that the conveyor rollers 17 receive the articles from this mechanism for discharge from the apparatus.

Between the spaced conveyor roller sections represented by the frame members 14 and 16, is located an oscillatory or pivotally mounted conveyor section 22 consisting in side frames 23 between which are supported a live roller 24 and an adjustable idler roller 25. The rollers 24 and 25 carry a conveyor belt 26. The live roller 24 (Figs. 1 and 2) is connected by a drive chain 27 to a power sprocket 28 driven in a well known manner by the electric motor 29 carried on the laterally extending frame braces 18. It is observed in Figs. 1 and 2, that the oscillatory conveyor 22 has its pivot axis coinciding with the axis for the power roller 24. This is simply accomplished by employing the shaft 30 for supporting the roller 24 as well as utilizing it for the pivot shaft for the frame 22. Thus, the oscillatory conveyor 22 may move in a vertical direction about the axis of shaft 30 without interfering with the operation of the conveyor belt 26 driven through motor means 29. The conveyor 22 is adapted to be movable between an inclined article receiving position and a depressed article carrying and discharge position, the same being fully disclosed in connection with Figs. 10 and 13.

Between the inner end of the conveyor roller group 15 and the adjacent end of the oscillatory conveyor 22, there is provided a control means 32 having a free running roller 33 carried by a pair of spaced arms 34 extending along each side of the frame 10. The control is more clearly shown in Figs. 3 and 4 as having angularly directed arm portion 35 interconnected by a cross member 36 on which is mounted a counterweight group 37. Intermediate the ends of the arms 34 are located bearing bosses 38 providing pivot openings for mounting the same on suitable pivot pins 39.

Between the roller group 15 and the oscillatory conveyor 22 there is also disposed a stop member 40 (Figs. 1, 3, 7 and 9) which is carried on a pair of spaced arms 41 extending parallel with and adjacent the arms 34. Each of the arms 41 has a bearing boss 42 to receive the pivot pins 39 which support arms 34. Rearwardly of the pivot bosses 42, the arms 41 are interconnected by a cross member 43 carrying a counterweight group 44. The counterweight supporting member 43 is attached between the angularly directed portions 45 of arms 41, which angularly directed portions 45 lie parallel with the previously described angularly directed portions 35 of arms 34. In Figs. 3 and 4, it is clear that the arm portions 35 are engaged with and supported by the cross member 43 connecting arm portions 45. However, the arms 35 are free to lift from the member 43.

Each of the arms 41 for the stop 40 is carried by the adjacent side wall 20 of the frame 10 on pivot elements 46 mounted in fixed bearings 47. The elements 46 engage in pivot bosses 48 on the arms 41. It is observed that the common axis for the pivot pins 46 is located outwardly of the common axis for the pivot pins 39. The weight means 37 and 44 are chosen so that the roller 33 and stop 40 will be held up, as in Fig. 2, and the member 43 will support the arm portions 35. Should the arms 35 be lifted from the member 43, the full weight of the control 32 would be shifted to the arms 41 at the pivot pins 39. Since the pins 39 are not aligned with the outer pivot pin 46, the stop 40 and its arms 41 will swing about the pivots 46.

It is noted in Figs. 2 and 10 that the oscillatory conveyor 22 is normally maintained in an upwardly tilted position, that is with the idler roller 25 located angularly above the power roller 24. The conveyor 22 is maintained thus by means of counterweighted lifting arms 50 (Figs. 2 and 3) which are suitably pivotally mounted by pivots 51 to the side walls 20 of the frame 10, such that the inner ends of the arms 50 may be interconnected by a member 52 carrying a suitable counterweight 53. The outer end of each arm 50 carries a roller element 54 which is adapted to engage on a roller abutment 55 (Figs. 2 and 10) carried by the frame of the oscillatory conveyor 22. Each of the arms 50 is provided with a trip finger 57 pivotally connected to the inner end of the arm 50 adjacent the counterweight location by the element 58. The trip finger 57 is limited to free motion in one direction only and is provided with a stop pin 59 on the arm 50 to prevent reverse motion of the finger relative to the arm 50.

Each of the stop arms 41 is provided with a trip finger 60 (Figs. 2, 3 and 7) which is pivoted thereto at 61 and is permitted a predetermined degree of movement in only one direction relative to the arm 41 by means of the fixed pin 62 disposed in an elongated slot 63 in the body portion of the finger 60. The trip finger 60 is provided with an elongated angularly directed cam face 64 which engages a roller follower 66 carried on the adjacent one of a pair of latch arms 68. Each latch arm 68 is mounted on the frame wall 20 (Fig. 8) by suitable means 67 for pivotal movement about the pin 69, and is provided at its upper end with a notch 70 (Figs. 7, 8 and 10) adapted to engage a cross member or latch bar 71 forming a part of the stop 40.

Turning to Figs. 1, 3, 7 and 9, the counterweight 53, between the arms 50 for lifting the hinged frame 23 for the conveyor belt 26, carries an angle member which acts as a lift finger 72 for the stop 40. The finger 72 projects rearwardly into the path of movement of the latch bar 71 on the stop 40 whereby it may engage the bar 71 and positively lift the stop 40 into its article interrupting position during the time a preceding article is on the belt 26 and has moved the same down. Concurrently, the latch arm 68 will snap into locked position, with its notch 70 engaging the bar 71. The latch 68 is released from the bar 71 only when the trip fingers 57 are moved downwardly into engagement with the roller 66. This latter action occurs when the hinged conveyor 22 moves into its tilted position by the action of the counterweight 53 on arms 50. The stop pin 59 prevents the finger 57 from moving so it may act on the latch arm 68 when moved downwardly. However, the finger 57 is free and ineffective to displace the latch 68 when moved upwardly past the roller 66 thereon.

Figure 7:
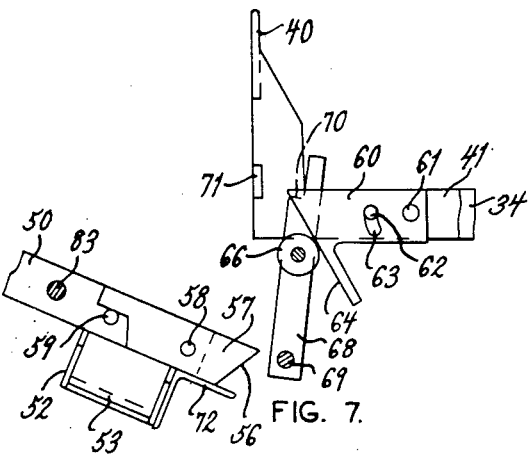
Fig. 7 is a greatly enlarged fragmentary view of latching and tripping mechanism, the view being taken at line 7—7 in Fig. 3.
Figure 8:
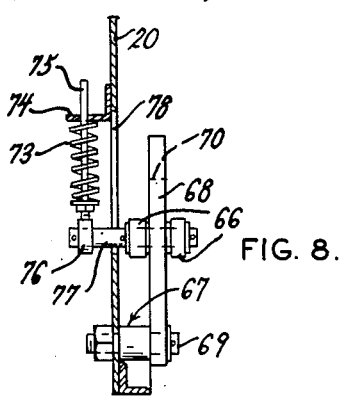
Fig. 8 is an enlarged sectional view of the latch arm and toggle spring assembly seen along line 8—8 in Fig. 2.

The latch arms 68 are held each in its normal inoperative position of Figs. 7 and 10 by means of a toggle spring 73 operatively carried at the outer face of the frame side wall 20 against a fixed plate 74. Each toggle spring 73 (Figs. 2 and 8) is mounted on a guide rod 75 which slides through the plate 74 and is fixed to a collar 76 carried by a rod 77 which extends through an opening 78 in the side wall 20 from its attachment in the latch arm 68. It is believed the action of each toggle spring assembly for retaining the latch arm in either one or the other of its over center positions is so well known that it needs no further description.

It should be pointed out here in connection with Figs. 2 and 7, that the first mentioned trip finger 57 carried by the arm members 50 is provided with an angularly directed cam face 56 which during a predetermined movement of the arm member 50 is adapted to engage the roller 66 on the latch arm 68 and cause movement of the latch arm in an angular direction opposite to the direction caused by the cam face 64 on the trip finger 60 carried by the stop arms 41. Thus, the adjacent pair of fingers 57 and 60 serve to control the position of the latch arm 68, while the toggle spring 73 maintains it in a given position until changed by action of a trip finger.

The operation of the present counting and conveying mechanism will be described in detail in connection with Figs. 10 through 14. In Fig. 10, an article A to be conveyed through the apparatus and counted is shown approaching, on the conveyor roller group 15, the location of the control means 32 and the stop 40. At this time, the oscillatory conveyor section 22 is shown in its normal elevated position so that its discharge end is above the adjacent discharge roller group 17. This condition or tilted position of the section 22 is brought about by means of the lifting arms 50 having a sufficient mass in the counterweight 53 on one side of its pivot 51 to offset the weight of the oscillatory conveyor frame and parts, thereby causing the angular elevation of the latter through the abutment of the roller 54 of arm 50 on the plate 55.

In Fig. 11, the article A is shown as having progressed sufficiently far to cause downward movement of the control member 32, thereby swinging the arm members 34 about their respective pivots 39 and elevating the rearwardly extended counterweighted arm portions 35. When this occurs, the full weight of the control means 32, that is the weight of the arms 34, the counterweights 37 on the cross member 36 and the load necessary to cause the displacement of the control 32 is transferred to the adjacent arms 41 of the stop means. Since the arms 34 are carried by the arms 41, the full support of the control means 32 is thereby transferred to the arms 41 causing the latter to pivot about the pivot elements 46. As a consequence, depression of the control means 32 by the advancing movement of an article A will result in quite rapid following movement of the stop 40 to permit unobstructed further advance of the article A. With the control means 32 and the stop 40 removed from the path of the article A, the article is free to advance to the conveyor belt 26, to be conveyed thereby through the conveyor section 22 to the discharge conveyor rollers 17.

As the arms 41 swing downwardly to remove the stop 40 from the path of article A, the trip fingers 60 engage the rollers 66 on the latch arms 68 and cause the latches to snap over center into a "ready" position against the latch bar 71. This action places the notch 70 in the latch arm 68 alongside the latch bar 71 ready to engage the bar upon the next upward movement of the stop 40. The "ready" is shown in Figs. 11 and 12.

It is important to point out that in the preferred construction, the oscillatory conveyor frame 22 and the conveyor belt 26 thereon are located with the plane of the active portion of the belt 26, that is the upper span or pass, located above the plane of the conveyor roller group 15. This difference in the elevation of the two conveyor portions results in each article A having its forward edge raised as it abuts the conveyor belt 26. Each article A, on being elevated at its forward end, progresses onto the conveyor belt 26 at an angle, thereby lifting it from the control means 32 and stop 40. Eventually the weight of the article will overbalance the mass of the counterweight 53 on arms 50 and cause the conveyor frame 22 to move downwardly, so that the top span of its conveyor belt 26 will assume a more horizontal position substantially in registry with the plane of the adjacent discharge rollers 17.

With reference to Fig. 12, it is noted that the article A assumes an angular position above the location of the control means 32 and the stop 40. The angular position assumed by each article, at this particular time establishes a space between the under surface of the article A and the control means 32 into which the control means 32 may move by reason of the action of its counterweights 37. Upward displacement of the control means 32 causes its arm members 34 to return toward a position in which the outer end portions 35 thereof again rest upon the cross member 43 for the arm members 45. This tends to relocate the weight of the control means 32 at the outer side of the pivot axis for pivot pins 46. When thus relieved, the counterweights 44 for arms 41 resume their function to elevate the stop means 40 to its normal article interrupting position shown in Fig. 10. This upward movement of the stop 40 is assisted by the lifting finger 72 on the counterweight 53 for the arms 50, as previously described.

Figure 13:
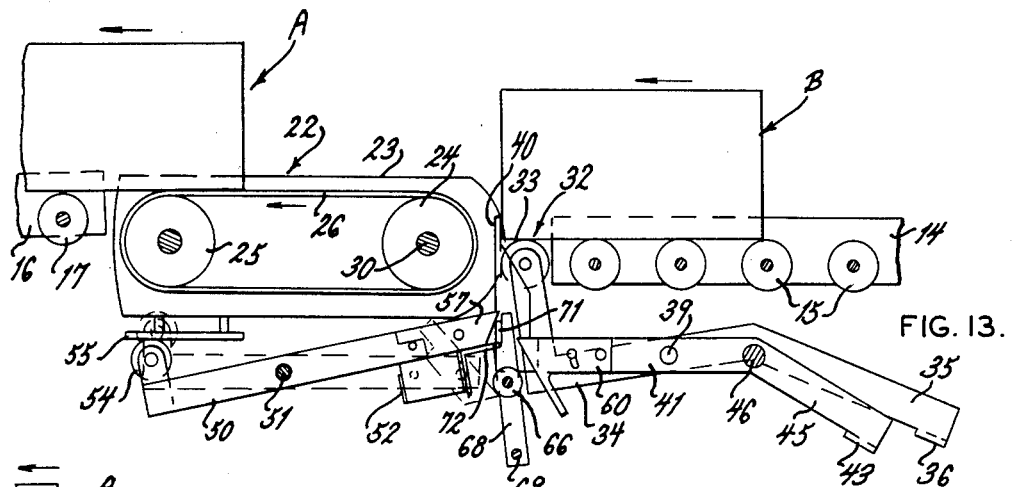
Fig. 13 is a diagrammatic view showing the apparatus in one limited position of its full cycle of operation.
Figure 14:
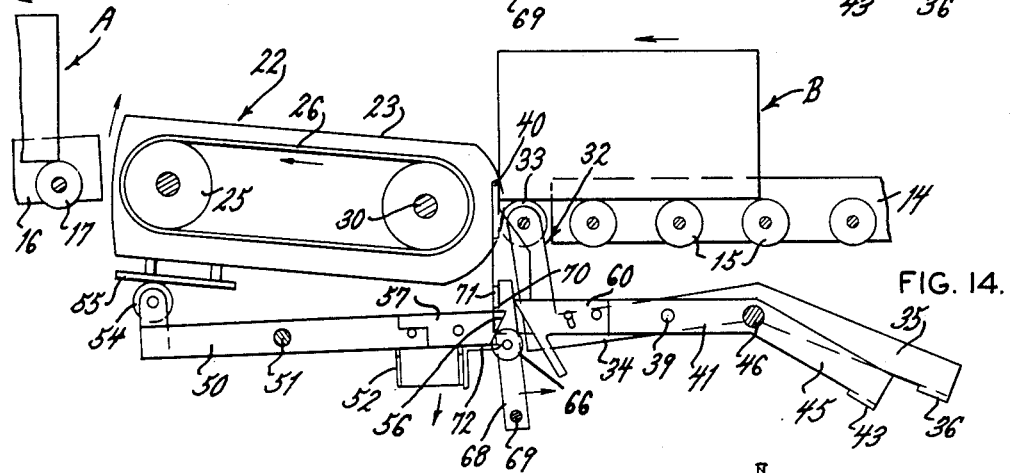
Fig. 14 is a further diagrammatic view of the present apparatus showing the reversal of movement thereof from the limited position of Fig. 13, the parts ultimately returning to the normal position of Fig. 10.

Turning to Fig. 13, it is observed that the conveyor 22 is in its depressed position and article A has now been carried by the conveyor belt 26 to a position where it is partly transferred to the discharge rollers 17. With article A in this position, a following article B, arriving on the conveyor rollers 15 will depress control means 32, but it will be arrested against further advancing movement by the stop means 40. Observe that in this position of article A, the lifting arms 50 for the oscillatory conveyor frame 22 are held in the inactive position of angular displacement by the presence of article A on the conveyor belt 26. The downward operation of the arm 50 is thus delayed during the time it takes article A to clear the belt 26. Once arm 50 is free, the action of trip finger 57 engaging the follower roller 66 on the latch arm 68 can become effective to displace the latch arm 68 from its latch position relative to the stop 40. Consequently, article B will not be permitted to advance beyond the position shown in Fig. 13, until the preceding article A has been fully discharged from or is clear of the conveyor belt 26, and the oscillatory conveyor frame 22 started on its return to the tilted or angular position, by the action of the counterweighted arms 50. Downward movement of arms 50 (Fig. 14) brings the trip fingers 57 thereon into contact with the follower rollers 66 to snap or shift the latch 68 to the normal position of Fig. 7. The displaced position of the control means 32 is thereby effective to cause withdrawal of the stop 40. Article B is then released for movement into contact with the conveyor belt 26, after which it will be carried through the apparatus in the same manner as that described for article A.

The foregoing cycle of operation described in relation to articles A and B repeats itself automatically when a large number of articles are received by the apparatus. The result is that the articles are conveyed through the apparatus in a spaced or segregated order. The spacing or segregating of the articles is performed by the oscillating movement of the conveyor section 22, in combination with the control means 32, the stop 40 and the several counterweighted arms 34, 41 and 50.

The counting of the articles is obtained by mounting a counter 80 of any well known make at the side of the frame wall 20 (Figs. 1 and 2) adjacent the path of movement of one of the arms 50. The cycle of movement of arm 50 corresponds with the spaced movement of each article and thus directly reflects the number of articles being conveyed by the apparatus. The counter has its arm 81 connected by a link 82 with a pin 83 on the arm 50.

What I claim is:

1. In article conveying apparatus, the combination of a conveyor having article receiving and discharging sections and a normally inclined transfer conveyor section between said first mentioned sections, said inclined conveyor being movable under the weight of an article to a position substantially aligned with said discharge conveyor section, stop means to interrupt passage of articles onto said transfer conveyor, means latching said stop means in its article interrupting position, means for actuating said latching means to release said stop means upon return of said transfer conveyor section to its inclined position, and means responsive to the presence of an article on said receiving conveyor section for removing said stop means to allow movement of the article onto said transfer conveyor section.

2. In article conveying apparatus, spaced conveyor sections located at different elevations, an intermediate transfer conveyor section pivotally movable between an inclined article receiving position and a position substantially aligned with one of said spaced conveyor sections, counterweighted means for urging said transfer conveyor section into its inclined position, said counterweighted means being overcome and said transfer conveyor section being moved to said aligned position by an article moving onto said transfer conveyor section, article stop means normally urged into article stop position in advance of said transfer conveyor section, control means for moving said stop means out of article stop position in response to the movement of an article toward said transfer conveyor section, a latch for holding said stop means in article stop position, independent of said control means, and latch trip means for operating said latch to release said article stop for movement by said control means.

3. In article conveying apparatus, a conveyor movable between an inclined article receiving position and a depressed article discharge position, said movable conveyor having a pivotal frame, rollers on said frame, and a conveyor belt on said rollers, said conveyor having said pivotal frame disposed to receive articles adjacent its pivot and to discharge the articles remote therefrom, counterweighted means normally urging said conveyor into its inclined position, stop means disposed adjacent the article receiving end of said conveyor to interrupt the movement of articles thereto while an article is being conveyed by said conveyor, the conveyed article overcoming said counterweighted means and causing movement of said conveyor toward its depressed position, and automatic means adapted to remove said stop means from the path of an article moving to said conveyor following discharge of an article from said conveyor.

4. The apparatus set forth in claim 3, wherein said counterweighted means includes a lever having a pivot intermediate its ends, a counterweight adjacent one end and a roller carried adjacent the opposite end for abutment with said conveyor to urge the latter into said inclined position.

5. The apparatus set forth in claim 3, wherein said stop means comprises a lever having a pivot intermediate its ends, a stop element projecting at one end and counterweights adjacent the opposite end, said counterweights urging said lever about said pivot in a direction to position said stop in the path of articles to be received on said conveyor.

6. The apparatus set forth in claim 3, wherein said last mentioned means includes a control lever movably carried by said stop means and having a member engaged by an article for moving said control lever independently of said stop means, and counterweights on said control lever for moving said stop means following said independent movement of the lever.

ALBERT A. MAYER.

References Cited in the file of this patent

UNITED STATES PATENTS

| Number | Name | Date |
|---|---|---|
| 2,493,464 | Nelson | Jan. 3, 1950 |
| 2,573,848 | Kirchner | Nov. 6, 1951 |

FOREIGN PATENTS

| Number | Country | Date |
|---|---|---|
| 278,861 | Great Britain | Oct. 20, 1927 |
| 416,595 | Germany | July 21, 1925 |